Feb. 4, 1936.  S. McMICHAEL  2,029,630
WATER PIPE
Filed Aug. 13, 1934
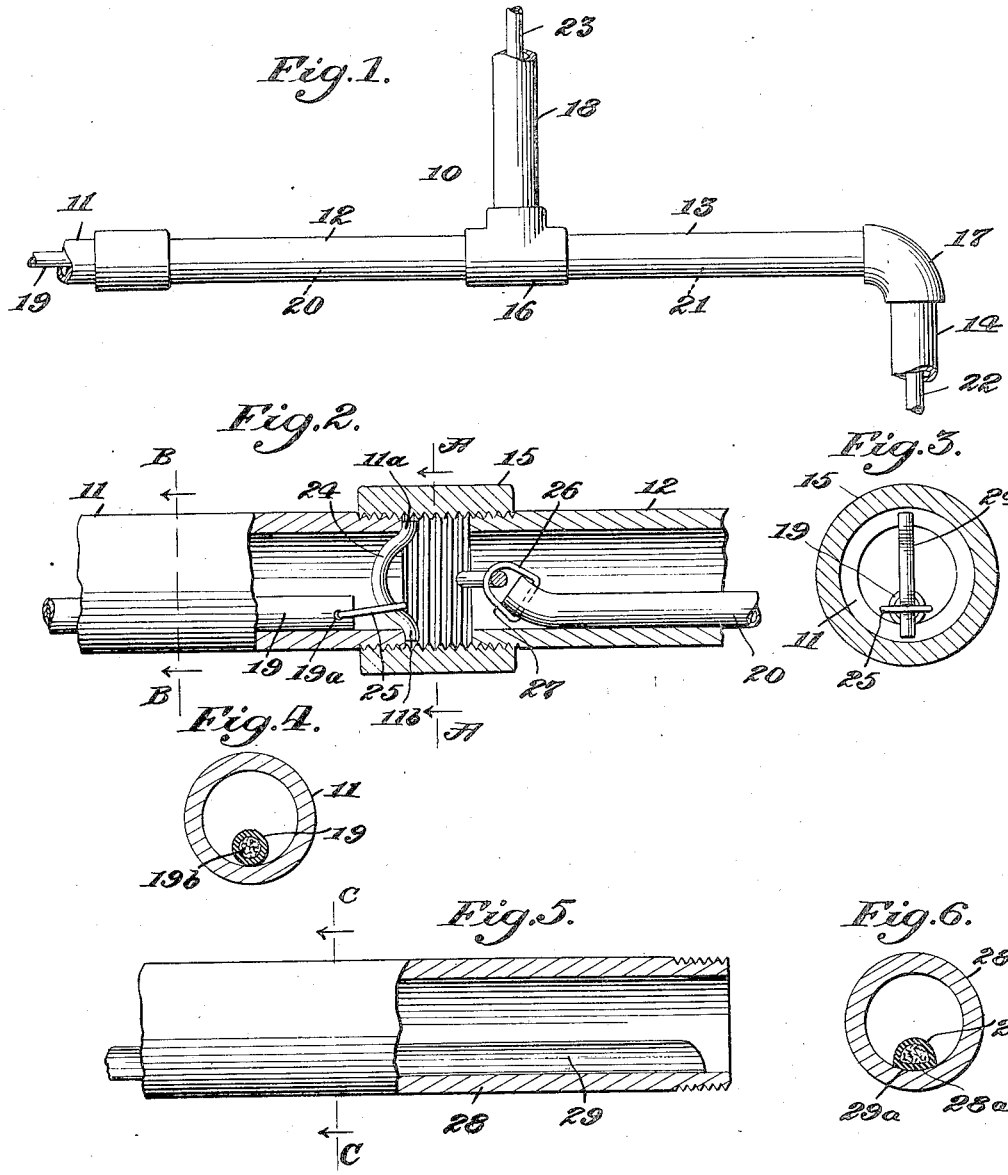
Inventor:
Samuel McMichael,
by John Howard Joynt
his Attorney.

Patented Feb. 4, 1936

2,029,630

UNITED STATES PATENT OFFICE 2,029,630

WATER PIPE

Samuel McMichael, Round Hill, Va., assignor, by mesne assignments, of one-fifth to Rachel C. Smith, Berryville, Va.

Application August 13, 1934, Serial No. 739,696

6 Claims. (Cl. 138—28)

This application is a continuation in part of my copending application Serial Number 721,581, filed April 20, 1934, and entitled Water pipe, and the invention relates to fluid handling apparatus and more particularly to pipes or conduits for handling fluids susceptible to freezing.

Among the objects of my invention is the provision in a simple, inexpensive and thoroughly practical manner of fluid handling apparatus especially adapted to efficiently and reliably withstand a continuous and/or interrupted flow of fluid, repeated freezing and thawing of the fluid, and like conditions encountered in actual practical use, with a minimum of attention and/or repair, all at a minimum of cost, installation and upkeep.

The invention, accordingly, consists in the combination of elements, features of construction and arrangement of parts as described herein, the scope of the application of which is indicated in the following claims.

In the accompanying drawing Figure 1 is a detached view of a section of pipe-line embodying certain features of my invention, Figure 2 is a view, on an enlarged scale, of a portion of the pipe-line shown in Figure 1, Figure 3 is a cross-sectional view of the portion of pipe-line shown in Figure 2 as seen from the plane section A—A looking in the direction of the arrows, Figure 4 is a cross-sectional view of the pipe-line of Figure 2 as seen from the plane section B—B looking in the direction of the arrows, Figure 5 is a showing of a modified form of protected pipe-line, certain parts being shown in section, and Figure 6 is a sectional view of the modified protected pipe-line shown in Figure 5 as seen from the plane C—C looking in the direction of the arrows.

As conducive to a clearer understanding of certain features of my invention it may be noted at this point that in heretofore known and/or used fluid handling apparatus, such as water pipe systems and lines where the line or system is installed and used in a locality or under conditions susceptible to freezing temperatures, considerable inconvenience, damage to property and unnecessary expense are encountered because of a freezing of the fluid within the pipe-lines and a consequent bursting of the pipe. In farm, rural and suburban sections there is a wide usage of water pipe in exposed or semi-exposed applications where the pipe is subjected to the extreme cold weather conditions of winter. In many of these applications it is difficult to effectively drain the pipes at the onset of cold weather and in all of these applications there is an opportunity for the lines to remain undrained because of misjudgment of weather conditions, neglect in draining the lines and the like, permitting the water to freeze, and in the change of state to ice, expand and exert great pressures which in many instances split the pipes along their lengths, break fittings and damage spigots and valves. In most instances the damage done is not discovered until after the weather conditions have changed and the ice has melted. Water then flows out through the split, broken or otherwise damaged portions of the system causing waste and in many cases causing a water damage to the proximate real and personal property. The required repair and replacement of sections of damaged pipe, fittings and valves are tedious and expensive and occasion objectionable delay and inconvenience.

While numerous attempts have been made to devise a pipe-line or water distribution system where the difficulties incident to a freezing of the system are either avoided or are rendered ineffective, such as by employing a system of copper or bronze piping, the necessary expense of these systems has been so great as to render them commercially impracticable and of limited use.

Accordingly, one of the outstanding objects of this invention is the provision of a simple, inexpensive and practical pipe-line or system of distribution of the character indicated, which lends itself to ready installation and/or use in a wide variety of indoor or outdoor applications in exposed or semi-exposed positions where freezing temperatures are commonly encountered and especially where the pipe-line or system is not readily accessible for inspection, draining or repair.

Referring now more particularly to the practice of my invention, in the ordinary contemplated operation of a water system of distribution water flows during such periods of time as the water is demanded and remains at rest within the various branches of the system during the remaining periods when there is no demand. When the distribution system is so located as to be subjected to wide temperature changes, as in accordance with changing weather conditions, there is a great tendency for the water in the various pipe sections, fittings, valves and the like comprising the several branches of the system to assume corresponding temperatures.

With the onset of cold weather, especially where there is little or no flow of water through the system for periods of several hours at a time, there is a tendency for the water in the system to become chilled and freeze to a solid mass exerting great pressures within these various parts of the system, which are ordinarily sufficient to split pipe sections, break fittings and break or distort valves, spigots and the like.

To prevent damage incident to the freezing of water within the various branches of the system and the necessary delay, inconvenience and expense required to replace or repair damaged portions, in accordance with the provisions of my invention I provide a distribution system of pipes, fittings and valves, wherein expansion-absorbing elements, preferably rubber stripping are linearly positioned within the various sections of pipe. As water then chills and freezes within the various parts of the system the volumetric expansion of the water in freezing and its change of state to ice is compensated by a volumetric contraction and/or distortion of the expansion-absorbing elements within the various sections of pipe included in the system. This action precludes the development of pressures, either linearly or radially, within the sections of pipe from reaching such high values as to split, break, rupture or otherwise damage either the various pipe sections or the interconnecting fittings and the distributing valves and spigots. (Conveniently, the expansion-absorbing means are not positioned within the fittings and valves but as water within the system begins to freeze and forms a slush the accompanying volumetric expansion within the fittings and valves is distributed throughout the system and is absorbed by the means provided.)

Referring now to the drawing, and especially to Figure 1, a section of pipe-line generally denoted 10 including a main section comprising lengths of galvanized iron pipe 11, 12, 13 and 14 interconnected by galvanized iron coupling 15, T 16 and elbow 17 (a straight length of pipe 18 engages T fitting 16 providing a branch supply) supplies water from a source (not shown) to any suitable outlets (not shown).

Positioned within pipe sections 11, 12, 13, 14 and 18 are corresponding sections of compressible stripping 19, 20, 21, 22 and 23 preferably of such respective lengths as to substantially correspond to the lengths of pipe. These sections of stripping are secured to the corresponding lengths of the pipes in any suitable manner, as appears more fully hereinafter.

Referring now, more particularly to Figures 2 and 4 in order to obtain adequate compressibility of the stripping employed and yet assure the desired resistance to wear (see Figure 4) the stripping 19 is preferably fashioned of rubber molded about a core 19b of a desirably, highly compressible material. Conveniently, the core of the stripping is of cotton or wool rope, although a loosely twisted hemp rope gives good results. The rubber surrounding the compressible core 19b forms a wall 19c which is tough, flexible and resistant to the action of air and water. During the freezing of the fluid within the pipe length this flexible wall effectively transmits the expansion of the fluid to the compressible core providing a highly efficient expansion-absorbing means which is well adapted to withstand the many varying conditions encountered in actual practical use.

The relative sizes of pipe lengths and corresponding sections of stripping (either relative volumetric dimensions or comparative sectional areas, since the lengths of pipe and stripping are substantially the same) are such as to assure a sufficient contraction of the stripping corresponding to the expansion of the water in the pipe in changing its state to ice during freezing, that the development of pressures sufficiently great to damage the pipe, fittings or other parts of the system is effectively precluded. The relative sizes of interior pipe section and stripping, however, are not such as to materially impede the passage of water through the system. Good results are achieved in a water distributing system of the character described when the sectional area of the stripping amounts to about one-quarter of that of the corresponding length of pipe.

In the installation of a system of distribution, in accordance with the provisions of my invention, lengths of stripping are cut from a convenient roll of such stripping which correspond to the required lengths of pipe used in the particular installation. The ends of the various sections of stripping are conveniently vulcanized or otherwise sealed as desired to assure a complete covering for the compressible core and preclude the fluid within the pipe from entering the stripping. The ends of the stripping are then secured to the ends of corresponding lengths of pipe in any convenient manner, either before or during the making up of the system. For example, referring to Figures 2 and 3, strip 19 positioned within pipe section 11 is securely fastened to the adjacent end of the pipe by means of a metallic U bracket 24 extending across a diameter of the pipe and frictionally engaging the inner walls thereof as at 11a and 11b and an interfitting metallic link of wire 25 engaging a pierced end portion 19a of the stripping. It is to be noted at this point that the vulcanizing or otherwise sealing of the ends of the expansion-absorbing stripping extends sufficiently along the length of the stripping to permit a piercing of these ends for fasteners, as indicated above, without rendering the stripping susceptible to leakage causing a loss in the compressibility of the stripping and a decomposition and rot of the core material.

Referring now back to Figure 2, the U bracket 24 is preferably of a corrosion-resistant metal, such as rustless steel which has sufficient spring-like properties to assure a firm contact with opposite sides of the end of the pipe. Conveniently metallic link 25 is of a corrosion-resistant material such as rustless iron, which is strong and yet which may be readily bent and looped through the pierced end of the stripping.

Similarly, the expansion-absorbing stripping 20 positioned within pipe section 12 is secured to one end of the pipe by means of metallic link 26 inter-threading a pierced portion of strip 20 and interlinking U bracket 27 which frictionally engages the adjacent end of pipe section 12.

Certain practical advantages in installation and use are achieved, see Figures 5 and 6, by employing galvanized iron pipe 28 having expansion-absorbing stripping 29 secured along an inner side-wall thereof in any suitable manner, as by cementing or vulcanizing during the manufacture of the pipe. As a matter of convenience in manufacture, the compressible core 29b of stripping 29 (see Figure 6) is circular in section while the molded rubber walls are conveniently semi-circular in overall section in order to present a comparatively broad face 29a contacting a portion of the inner side-wall 28a of the pipe to give a maximum adhering surface between strip and pipe with minimum expense. It will be understood, however, that good results are achieved by employing stripping of circular section fastened along the length of the inner side-wall of the pipe in any suitable fashion.

With this construction where the expansion-absorbing strip is made integral with the pipe, the sections of pipe may be cut, threaded and installed, the expansion-absorbing feature requiring a minimum of attention.

Thus, it will be seen that there has been provided a system of distribution in which the various objects hereinbefore set forth, together with many thoroughly practical advantages are successfully achieved. It will be seen that my protected distribution system is simple and economical in construction and/or installation, and that it is well adapted to reliably withstand the varying conditions of actual, practical use.

While as illustrative of my invention the installation of a new system is described, it will be understood that many highly beneficial features of my invention are achieved by installing the expansion-absorbing stripping in existing systems of distribution, as by opening up certain sections of the system and fishing lengths of the stripping through the various pipe lengths, conveniently running the stripping through couplings, T's, elbows and like fittings and securing the ends of the stripping at the points of opening in any suitable manner, such as described above and as indicated in Figures 2 and 3.

Likewise, while as illustrative of my invention, expansion-absorbing stripping having a highly compressible core of wood, cotton, hemp or like loosely twisted rope or cord covered by a molded rubber flexible protecting cover made integral therewith is described above, it will be understood that where desired expansion-absorbing stripping having a core of sponge rubber, cork or other highly compressible material covered by a molded rubber, or stripping fashioned entirely of sponge rubber or stripping comprising hollow rubber-tubing having side-walls sufficiently strong to withstand normal fluid pressure within the pipe system to be protected without collapse yet sufficiently flexible to collapse under the extreme pressures encountered in a freezing of the fluid, may be employed as expansion-absorbing means in my improved fluid distribution system without departing from the scope of my invention.

As many possible embodiments may be made of my invention and as many changes may be made in the embodiments hereinbefore set forth, it is to be understood that all matter described herein or shown in the accompanying drawing is to be interpreted as illustrative and not in a limiting sense.

I claim:

1. In fluid handling apparatus, in combination, a fluid container, expansion-absorbing means comprising a compressible core and rubber walls positioned within said container, whereby the expansion of fluid within the container is absorbed by said means, and fastening means secured to the ends of said expansion-absorbing means and to said container for maintaining the position of said first-mentioned means linearly respecting said container.

2. In fluid handling apparatus, in combination, a fluid container, and expansion-absorbing means positioned in said container, said means comprising a compressible core and molded rubber walls, whereby the expansion of fluid within the container is absorbed by said strip thereby relieving excessive pressure on the side-walls of said container.

3. In fluid handling apparatus, in combination, a conduit for fluids susceptible to freezing, and a rubber strip having an expansion-absorbing core positioned within said conduit, whereby the expansion of fluid resulting from a freezing thereof is absorbed by said strip thereby relieving excessive pressures on the side-walls of said conduit.

4. In fluid handling apparatus, in combination, a conduit for fluids susceptible to freezing, and a resilient strip comprising a loosely twisted hemp rope core and molded rubber walls positioned within said conduit, whereby the expansion of fluid resulting from a freezing thereof is absorbed by said strip thereby relieving excessive pressure on the side-walls of said conduit.

5. In fluid handling apparatus, in combination, a conduit for fluids susceptible to freezing, and a resilient strip comprising a loosely twisted cotton rope core and molded rubber walls positioned within said conduit, whereby the expansion of fluid resulting from a freezing thereof is absorbed by said strip thereby relieving excessive pressure on the side-walls of said conduit.

6. In fluid handling apparatus, in combination, a conduit for fluids susceptible to freezing, and a resilient strip comprising a soft cork core and rubber walls positioned within said conduit, whereby the expansion of fluid resulting from a freezing thereof is absorbed by said strip thereby relieving excessive pressure on the side-walls of said conduit.

SAMUEL McMICHAEL.